US007415716B2

(12) United States Patent
Marin et al.

(10) Patent No.: US 7,415,716 B2
(45) Date of Patent: Aug. 19, 2008

(54) COMPONENT INTEGRATOR (75) Inventors: Mike A. Marin, Laguna Hills, CA (US);
Daniel S. Whelan, Dana Point, CA (US); Michael G. Winter, Camarillo, CA (US)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 10/745,463

(22) Filed: Dec. 23, 2003

(65) Prior Publication Data

US 2004/0230941 A1    Nov. 18, 2004

Related U.S. Application Data

(60) Provisional application No. 60/441,512, filed on Jan. 17, 2003, provisional application No. 60/505,017, filed on Sep. 17, 2003.

(51) Int. Cl.
*G06F 3/00* (2006.01)
*G06F 9/44* (2006.01)
*G06F 9/46* (2006.01)
*G06F 13/00* (2006.01)
*G06F 15/16* (2006.01)
*G06Q 10/00* (2006.01)
*G06Q 30/00* (2006.01)

(52) U.S. Cl. .................. 719/330; 719/315; 719/320; 705/1; 709/201

(58) Field of Classification Search .................. 718/100, 718/106; 709/202, 204, 207, 201; 719/317, 719/312, 315, 318, 320, 328, 330; 705/1
See application file for complete search history.

(56) References Cited

U.S. PATENT DOCUMENTS 5,699,526 A    12/1997    Siefert

(Continued)

*Primary Examiner*—Thomas Lee
*Assistant Examiner*—Qing-Yuan Wu
(74) *Attorney, Agent, or Firm*—Konrad Raynes & Victor LLP; Janaki K. Davda (57) ABSTRACT

System and method allow for communication with and management of multiple external components. A component manager communicates with one or more component adapters. Each component adapter communicates with an external component and is able to call the methods, functions, procedures, and other operations of the external component. The component manager associates these external operations with local operations, such that an application may use local operation names to invoke the external operations. Furthermore, the component manager has component definitions and operation definitions that describe the component adapters and operations, including input and output parameters and the like. The component manager is able to receive a group of data including a local operation and a list of input and output parameters and determine from the foregoing information which external operation to call and which component adapter has access to the external operation.

20 Claims, 5 Drawing Sheets

U.S. PATENT DOCUMENTS

| | | | | |
|---|---|---|---|---|
| 5,721,906 | A | 2/1998 | Siefert | |
| 5,828,842 | A | 10/1998 | Sugauchi et al. | |
| 5,974,444 | A * | 10/1999 | Konrad | 709/203 |
| 6,026,403 | A | 2/2000 | Siefert | |
| 6,084,585 | A | 7/2000 | Kraft et al. | |
| 6,134,559 | A * | 10/2000 | Brumme et al. | 707/103 R |
| 6,138,170 | A | 10/2000 | Matheson | |
| 6,141,697 | A | 10/2000 | Hale et al. | |
| 6,141,723 | A | 10/2000 | Lyons | |
| 6,151,638 | A | 11/2000 | Hale et al. | |
| 6,192,418 | B1 | 2/2001 | Hale et al. | |
| 6,208,345 | B1 | 3/2001 | Sheard et al. | |
| 6,289,391 | B1 | 9/2001 | Smith et al. | |
| 6,480,855 | B1 | 11/2002 | Siefert | |
| 6,484,217 | B1 * | 11/2002 | Fuente et al. | 710/15 |
| 6,516,356 | B1 * | 2/2003 | Belknap et al. | 719/328 |
| 6,529,894 | B1 | 3/2003 | Haeri et al. | |
| 6,601,057 | B1 | 7/2003 | Underwood et al. | |
| 6,604,241 | B1 | 8/2003 | Haeri et al. | |
| 6,721,713 | B1 | 4/2004 | Guheen et al. | |
| 6,904,454 | B2 | 6/2005 | Stickler | |
| 6,959,339 | B1 | 10/2005 | Wu et al. | |
| 6,973,626 | B1 | 12/2005 | Lahti et al. | |
| 7,197,700 | B2 | 3/2007 | Honda et al. | |
| 2001/0039594 | A1 | 11/2001 | Park et al. | |
| 2002/0129016 | A1 * | 9/2002 | Christfort et al. | 707/6 |
| 2002/0133635 | A1 * | 9/2002 | Schechter et al. | 709/310 |
| 2002/0178037 | A1 * | 11/2002 | Reading et al. | 705/7 |
| 2003/0055668 | A1 * | 3/2003 | Saran et al. | 705/1 |
| 2004/0010520 | A1 | 1/2004 | Tsang et al. | |
| 2004/0054747 | A1 * | 3/2004 | Breh et al. | 709/208 |
| 2004/0205075 | A1 | 10/2004 | LaTurner et al. | |
| 2004/0215635 | A1 | 10/2004 | Chang et al. | |

* cited by examiner

COMPONENT INTEGRATOR

RELATED APPLICATIONS

This application claims the benefit of U.S. Provisional Application No. 60/441,512, which was filed Jan. 17, 2003 and U.S. Provisional Application No. 60/505,017, which was filed Sep. 17, 2003. This application is being filed concurrently with related U.S. patent application Ser. No. 10/745,474, titled "System and Method for Accessing Non-Compatible Content Repositories," and related U.S. patent application Ser. No. 10/745,346, titled "System and Method for Directing Content Entry,". The foregoing provisional applications and related applications are hereby incorporated in their entirety by this reference.

BACKGROUND OF THE INVENTION

1. Field of the Invention

Aspects of the invention relate to the integration, within local applications, of external operations performed by external components.

1. Description of the Related Art

Organizations often employ computer applications to manage data and perform other processes. Many times, the applications may perform these processes using local operations, including local methods, local functions, local procedures, and the like. Other times, however, the applications require access to external operations that run, for example, on external servers. The external operations may operate in a different environment from the local applications, such that the local applications cannot directly execute them. One typical scenario in which this occurs is when an organization upgrades many of its local applications, but still requires access to external operations running on, for example, legacy systems. Typically, to access such external operations, organizations have been required to customly reprogram at least a portion of their applications. Such customized programming is expensive and time consuming.

In addition, organizations often desire to access external operations of other organizations, such as, for example, operations that allow one organization to order goods or services from another, to communicate, to share information, and the like. In many cases, such external operations have replaced more traditional communication methods, including telephone, facsimile, email, and written communication.

Figure 1:
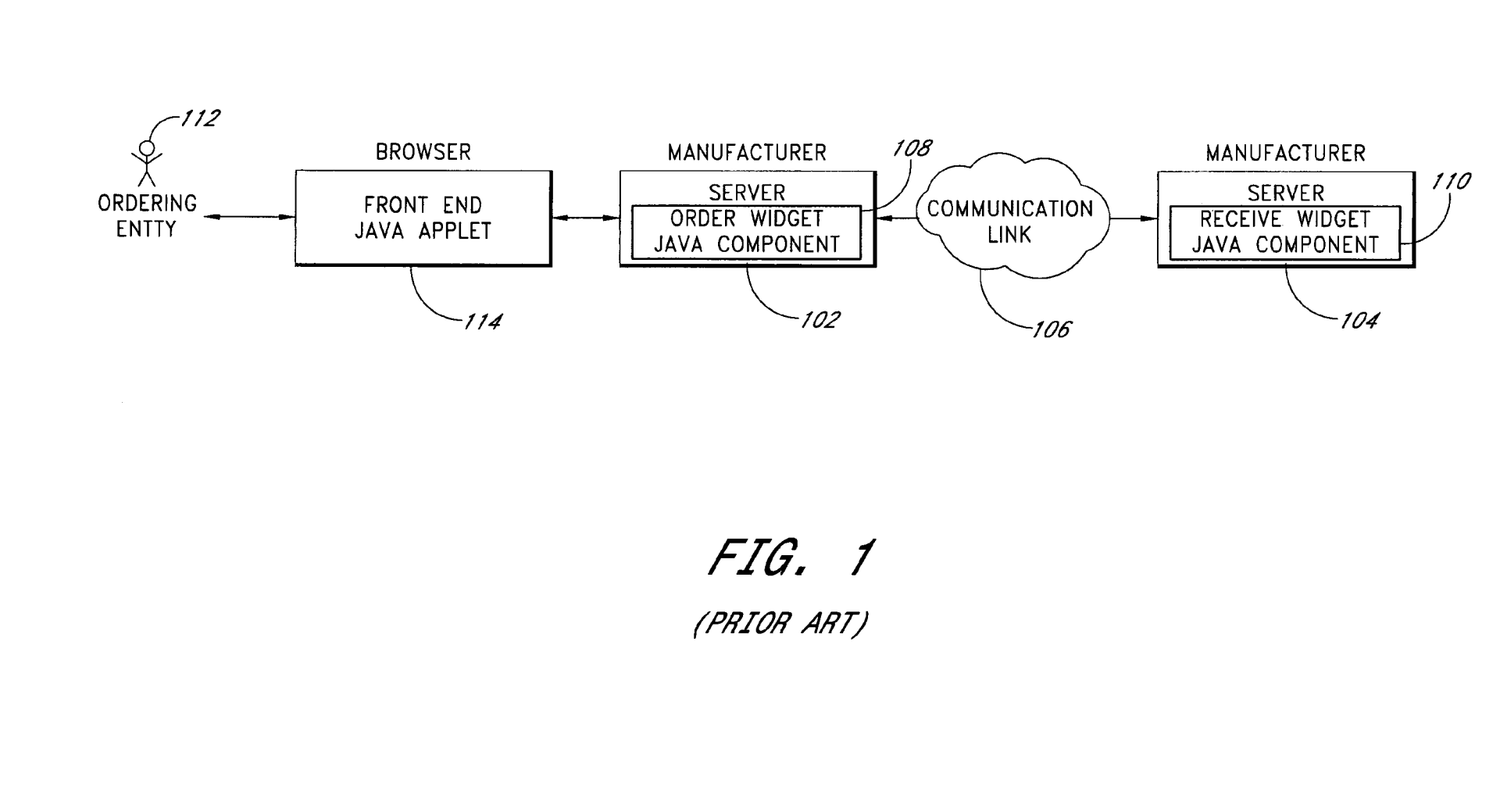
FIG. 1 is a block diagram illustrating one typical order communications system employing server-side Java components.

In both cases, accessing external operations typically requires server-to-server communication, where each server contains a communications component configured to send and receive certain information. For example, FIG. 1 illustrates a typical server-to-server communications system 100 used by one organization, in this example a manufacturer, to order widgets, over a computer network, from a supplier. As illustrated in FIG. 1, the manufacturer's server 102 and the widget supplier's server 104 are connected via any public, private, or combination communications link 106, including a direct cable connection, a network such as the Web or the Internet, a Local Area Network (LAN), a Wide Area Network (WAN), a wireless connection, or the like. The manufacturer's server 102 has an order widget component 108 configured to communicate, over the communications link 106, with an order receive component 110 within the widget supplier's server 104. The order widget component 108 and the order receive component 110 may be, for example, server-side Java components that, once instantiated, perform their tasks without significant human interaction. In fact, the order widget component 108 and the receive order component 110 may be entirely transparent to an ordering entity 112.

For example, the order widget component 108 typically transmits an order to the order receive component 110. The order receive component 104 typically records the order, determines that it can be filled, and sends a confirmation message to the order widget component 108. As illustrated, the ordering entity 112 may commence an order by logging into a front-end user interface 114, such as a Java applet, filling out information about the order, such as number of widgets ordered, and requesting transmission of the order. Also, the ordering entity 112 is responsible to determine when more widgets are needed and to order any necessary widgets. Typically, the ordering entity 112 may enter authentication information that is used by the order widget component 108 and the order receive component 110 to ensure security for the transaction. For example, the two components may use Java Authentication and Authorization Service ("JAAS").

As an increasing number of organizations implement such server-to-server communication, and when organizations must access a growing number of external operations located on legacy systems, the system of FIG. 1 becomes less effective. Each additional external component that must be accessed requires the expenditure of significant resources to manage a typical system such as the system of FIG. 1. Organizations must manage more components, more servers, more user interfaces, more authentication and security information, and the like. Such management may be especially difficult where, as often occurs, each component communicates using different parameters, data formats, and the like. These factors and others diminish the capability of the system of FIG. 1 to scale to match increasing demands. Additionally, systems as shown in FIG. 1 typically perform one isolated function. These isolated server-to-server transfer functions have not been integrated into applications such as workflow processing systems, without requiring customized programming or reprogramming of the applications.

SUMMARY OF THE INVENTION

Systems and methods disclosed herein allow for the management and integration of multiple external components from within local applications. The systems and methods are extensible, such that the capability to access additional external components may be added without reprogramming the local applications. According to an embodiment, a component manager communicates with one or more component adapters. Each component adapter communicates with one or more external components and is able to call the methods, functions, procedures, and other "operations" of the external component. The component manager associates these external operations with local operations, such that an application may use local operation names to invoke the external operations. Furthermore, the component manager has component definitions and operation definitions that describe the component adapters and external operations accessible to the component adapters, including input and output parameters and the like. Based on the foregoing information, the component manager spawns one or more component adapters that communicate with one or more external components. The component adapters are able to receive a group of data including a local operation and a list of input and output parameters and determine from the foregoing information which external operation to call and which external component executes the external operation. The selection of a component adapter and an external operation may be transparent to a user or application program.

According to an embodiment, a component adapter receives groups of data, including a local operation and a list of input and output parameters, from local queues of local processes such as workflow processes or the like. The component adapter, or alternatively the component manager may poll the queues to determine if there is data in the queues, or one or more processes may send a message to the adapter or alternatively the component manager when additional data is added. When the component manager determines that there is data in the queues, the component manager retrieves the data, determines which component adapter is adapted to process the data, and transmits the data to an appropriate component adapter for processing. When, alternatively, a component adapter detects data in the queues, the component adapter retrieves the data and processes it. The component adapter instance communicates with a corresponding external component and instructs it to execute an external operation. After the external component executes the external operation, the external component communicates any results to the component adapter. The component adapter makes the resulting data available to applications either directly or through the component manager.

An application can access one or more external operations accessible to the component adapters by placing appropriate data on the queues. An interface for interacting with the queues enables a designer of an application to place data in the queues. Specific applications may provide graphical user interfaces to simplify access to the queues, and thus to the services of the component adapters, to users with little programming ability. A workflow processing engine may provide such a graphical user interface. By using the graphical user interface, a designer may integrate an external operation into a workflow process step. The designer may designate an external operation, set values for input parameters using fixed values or variables, and designate a local variable or data structure to receive any resulting data. When the workflow process is executed by a workflow process engine and a workflow process step invoking or executing an external operation is reached, the engine transmits appropriate data to the component adapters, such as by using the queues, and the process of communicating with an appropriate component adapter commences. After the process completes, transparently to the workflow process engine, the workflow process engine may receive useable output data resulting from the operation of the component adapter.

According to an embodiment, a configuration module communicates with repositories that contain component definitions and external operation definitions. The configuration module identifies, from these definitions, names, input parameters, output parameters, and the like, external operations that are accessible to each component adapter. Based on the information provided by the configuration module, the component manager may be able to manage access to additional external operations. Additionally, external components may be registered using a straightforward graphical user interface. As such, the system may be extended to access additional external components and operations without requiring customized programming.

In light of the foregoing features, this disclosure describes exemplary embodiments of systems and methods for accessing multiple external components. Moreover, the systems and methods described herein are extensible and scale well as additional public or proprietary external components become available. Furthermore, the systems and methods allow for external components and operations to be integrated with larger applications, such as, for example, workflow processing systems.

Embodiments of the systems and methods will now be described in detail with reference to the drawings.

DETAILED DESCRIPTION OF THE PREFERRED EMBODIMENT

An organization often has access to a large number of communications components that allow the organization to access a subset of external operations on external data. The systems and methods described herein provide a mechanism whereby such an organization may manage and communicate with multiple external components using one or more component managers. Additionally, the systems and methods allow an organization to integrate the external operations accessible through external components into the organization's applications, such that the organizations applications may behave as if the external components were part of organization's applications. Furthermore, an organization may use the systems and methods to integrate components found on legacy or other applications within the organization into a different application within the organization. A skilled artisan will appreciate that this disclosure discloses a general architecture that has other uses than those explicitly described herein. All such uses known to a skilled artisan in light of this disclosure are within the scope of the disclosure.

One type of application that can make use of the disclosed component integrator is known generally as a business process management system, workflow processing system, or workflow process engine. Another type of application that can make use of the component integrator is known generally as a content management system or an enterprise content management system. An exemplary environment in which any of the foregoing applications can be run, and into which components may be integrated, can include one or more processes, applications, or systems that govern some or all of: content defining and handling; definable business process execution; security management; versioning; public and private web publication; performance monitoring; replication; storage management; legacy systems compatibility; and the like. In some environments, actual data may be added, manipulated, modified, and deleted. Additional other data, such as metadata describing, for example, how, where, when or by whom actual data is collected, stored, formatted, and the like may be added, manipulated, modified, and deleted in place of or in additional to the actual data. For example, the following disclosure includes systems and processes that, in an exemplary embodiment, execute within or in conjunction with management software commercially available from FileNet Corporation of Costa Mesa, Calif., marketed under the names of "FileNet Business Process Manager," "FileNet Content Manager," and "FileNet Web Content Manager," the details of which are incorporated herein by reference.

While many embodiments are described herein in which the component integrator works in conjunction with workflow process engines, or content management systems, as described, the component integrator may be accessible to any application, and is not limited to being integrated with the foregoing workflow process engines or content management systems. A skilled artisan will appreciate, in light of this disclosure, that the component integrator as disclosed provides a general architecture for managing and providing access to multiple components.

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

Figure 2:
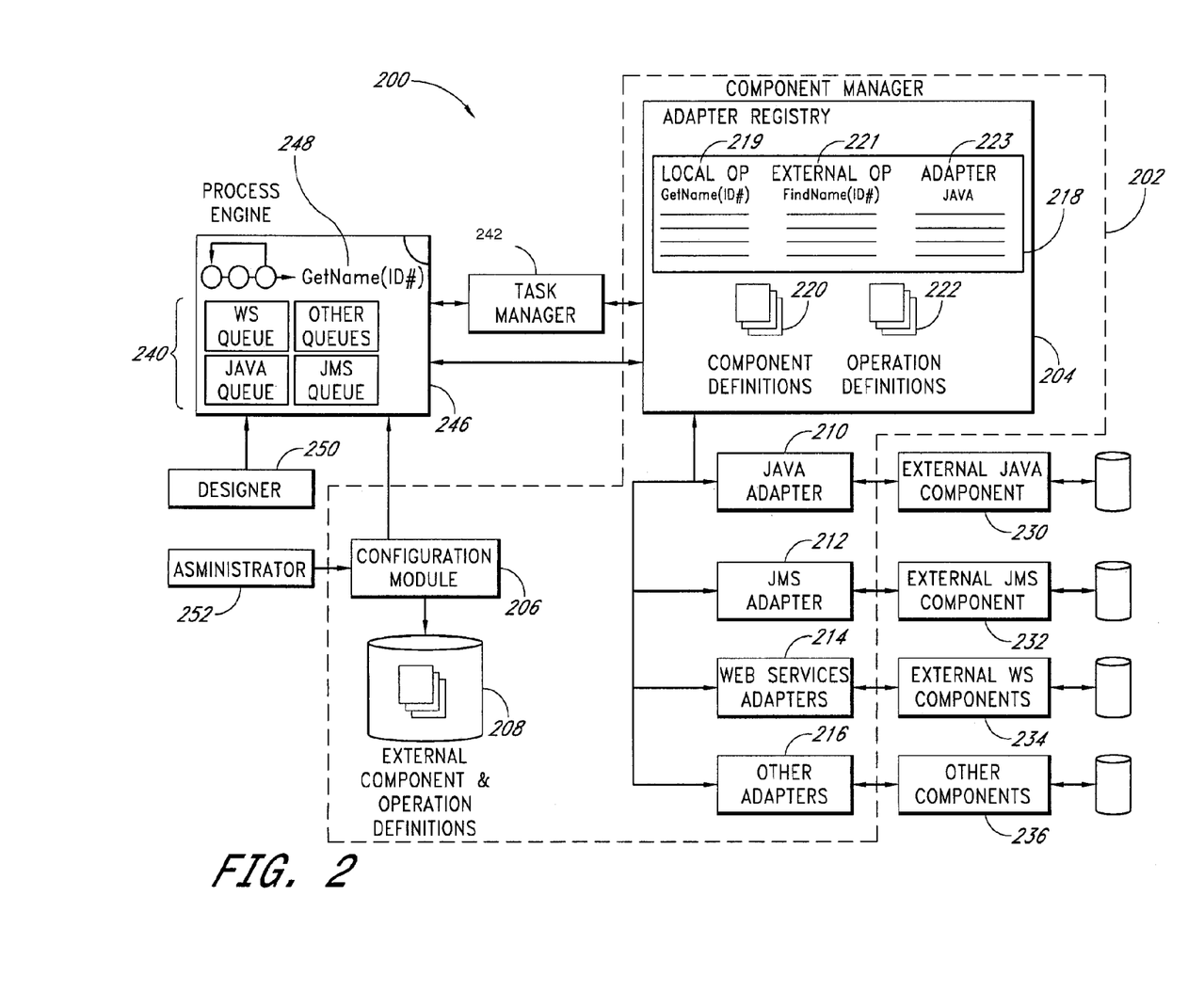
FIG. 2 is a block diagram illustrating an exemplary embodiment of an integrated component management and workflow processing system.

FIG. 2 is a block diagram of one exemplary embodiment of an integrated component management and workflow processing system 200. With regard to FIG. 2, arrows represent communications links, such that, for example, a component manager 204 communicates with a Java component adapter 210. With regard to every communications link shown on FIG. 2, such communication may be through any known communications medium, including any communications network, a LAN, a WAN, the Internet, a direct connection of any kind, a logical connection between, for example, two program modules that may be on one computer system, or the like.

A component management system 202 comprises a component manager 204, a configuration module 206, one or more external component and operation definition repositories 208, and one or more component adapters 210-216. The component manager 204 comprises an adapter registry 218, available component definitions 220, and available operation definitions 222. In one embodiment, the adapter registry 218 may be, or may rely upon, one or more tables that include a plurality of records containing a local operation name, an external operation name, local operation parameters, external operation parameters, and a name of one of the component adapters 210-216. The available component definitions 220 comprise definitions describing component adapters with which the component manager 204 may communicate. Included within each component definition 220 is a definition of a component adapter class to load to process events for the definition and configuration details about the component adapter, including, for example, the number of concurrent instances of the component adapter to spawn, a polling rate, if applicable, for the component adapter, and the like. The component manager 204 may provide interfaces for modifying such configuration details. The available operation definitions 222 comprise definitions describing operations, functions, methods, or the like that are part of any available components and with which the component manager 204 may communicate. Included within the available operation definitions 222 may be an operation name and a description of any parameters that are received by the external operations and of any parameters that are returned by the external operations. In one embodiment, the available component definitions 220 and the available operation definitions 222 may be encoded in Extensible Markup Language ("XML").

According to an embodiment, the component manager spawns a number of component adapters 210-216 according to the information in the adapter registry 218, the available component definitions 220, and the available operation definitions 222. A skilled artisan will appreciate, in light of this disclosure, that the adapter registry 218 is a mapping of local data elements, accessible to the process engine 246, and external data elements such as are used in the external components 230-236. Such mapping need not provide a one-to-one correspondence.

The configuration module 206 comprises tools configured to read the external component and operation definition repositories 208 and to extract external component and operation definitions therefrom. Included within these tools may be, for example, a Jar file reader configured to read Java Jar files and extract from them Java class and method definitions, a Web Services Description Language ("WSDL") reader that extracts Web Services function definitions from WSDL files, a reader that extracts Java Messaging Service ("JMS") schema, and readers for extracting any other type of operation from similar operation definition files known to a skilled artisan. The WSDL reader may be configured to retrieve WSDL files from a Universal Description, Discovery, and Integration ("UDDI") registry, or may read a WSDL file directly through any file system. The configuration module 206 further comprises a graphical user interface that may direct a user to select, among the operations extracted from the repositories 208, particular operations to import into and make accessible to the component manager 204. The repositories 208 include Java Jar files, UDDI registries, WSDL files, JMS schema, and the like. Based on the extracted information, the configuration module 206 configures one or more queues 240 configured to receive input concerning operations to be accessed using component adapters 210-216. The extracted information may also be added to the adapter registry 218, the available component definitions 220, and the available operation definitions 222 of the component manager 204.

The component adapters 210-216 comprise one or more Java component adapters 210, one or more JMS component adapters 212, one or more Web Services component adapters 214, and one or more other component adapters 216 known to a skilled artisan in light of this disclosure. The Java component adapters 210 comprise component adapters written in Java configured to communicate with one or more external Java components 230. The JMS component adapters 212 comprise component adapters written in Java configured to communicate, using the Java Messaging Service, with one or more external JMS components 232. The Web Services component adapters 214 comprise component adapters that use Web Services configured to communicate with one or more external Web Services components 234. The other component adapters 216 comprise component adapters configured to communicate with one or more other external components 236, as will be known to a skilled artisan in light of this disclosure. Examples of component models for which adapters can be built include Microsoft's Component Object Model ("COM") and Common Object Request Broker Architecture ("CORBA").

The component management system 202 is capable of communicating with multiple external components 230-236. The external components 230-236 comprise components that correspond to the component adapters 210-216 and, like the component adapters 210-216, they are components configured for server-to-server communication. Furthermore, like their corresponding component adapters 210-216, the external components 230-236 are generally implemented using Java, JMS, Web Services, or any other language or component model capable of implementing a component. The external components 230-236 differ from their corresponding component adapters 210-216, however, because the external components 230-236 are configured to receive requests and respond to them, whereas the component adapters 210-216 are configured to send requests and receive responses from the external components 230-236.

The component management system 202 may communicate with a plurality of queues 240. According to one advantageous embodiment, there is one corresponding queue 240 for each component adapter 210-216. The queues 240 each comprise one or more data structures that generally store a list of data. Generally, the queues 240 are first in, first out data structures. A task manager 242 communicates with both the component manager 204 and the queues 240.

According to one embodiment, the queues 240 provide input to the component adapters 210-216. This input may be provided directly, such that the component adapters 210-216 directly retrieve the data from the queues 240. Alternatively or additionally, the input may be provided indirectly, such that the component manager 204 retrieves the data, then transmits the data to an appropriate component adapter 210-216. Any input for a component adapter 210-216 may be placed on a queue 240 that corresponds to the component adapter 210-216 configured to perform a desired service or return desired data based on the input. In turn, any output from the component adapters 210-216, such as, for example, output received from one of the external components 230-236 may be communicated to the process engine 246, either directly or through the component manager 204. In one embodiment, the component manager 204 receives at least an indication that the component adapter 210-216 has completed an access of an external operation. The component manager 204 then communicates to the process engine 246 that an operation has completed, such that the process engine 246 can move on to another operation. In an embodiment, indicating that an operation has completed includes marking data items within the queue 240 with an indication that the operation to which the data items relate has completed. The process engine 246 may remove items from the queues 240 that have thus been marked.

According to one embodiment, the process of invoking external operations in external components 230-236 commences when data is placed in the queues 240. The component adapters 210-216, or the component manager 204, may poll the queues 240 to detect when data has been entered into the queues 240. Alternatively or additionally, the queues 240 may send a message to the component manager 204 or an appropriate component adapter 210-216 to inform the component manager of any new data. Thus, the detection of data that has been newly entered into the queues 240 may be event driven or operate through polling.

If the component manager 204 performs the detection, upon detecting new data in the queues 240, the component manager 204 may read the new data. Additionally, the component manager 204 may compare the data in the queues 240 to the available component definitions 220, to its available operation definitions 222, or to both. Generally, data entered into the queues 240 comprise function, method, procedure, or other operation names, values for any parameters associated with the function, method, procedure, or other operation, and variables for receiving any values to be returned by the external components 230-236.

By comparing the data found in the queues 240 with the data found in the adapter registry 218, the available component definitions 220, and the available operation definitions 222, the component manager 204 may determine both which component adapter 210-216 to access and which function, method, procedure, or other operation to invoke at the accessed component adapter 210-216. Additionally, when the component adapters 210-216 receive data directly from the queues 240, the component adapters 210-216 may determine, based on the received data and information derived from the adapter registry 218, the available component definitions 220, and the available operation definitions 222, which external component to execute. The component adapters 210-216 have access to this information internally, having been initially spawned according to the information found in the adapter registry 218, the available component definitions 220, and the available operation definitions 222. For example, one of the queues 240, the Java queue, may include the following data: "GetName," "100," and "CustomerName." As illustrated, GetName(ID#) is listed within the adapter registry 218 as a local operation 219. For ease of understanding, a function of the listed "GetName(ID#)" operation will be described generally. "GetName(ID#)" receives one parameter, an identification number ("ID#"), such as, for example, a customer number, and based on the ID#, returns a string containing a customer name. A skilled artisan will appreciate that many other functions, methods, procedures, or other operations may be accessed using the component adapters 210-216, and that this discussion of one exemplary operation in no way limits the invention.

Based on the information contained within the available operation definitions 222, the component manager 204 is able to determine that the data "GetName," "100," and "CustomerName" correspond to the local operation 219 "GetName (ID#)." Specifically, "GetName" is the name of the local operation 219, "100" is a value for the ID# parameter, and "CustomerName" is a data structure for receiving a string return value, containing a customer's name. The "CustomerName" data structure, as illustrated, or any data structure placed in the queues 240 for receiving a return value, may be any data structure known to a skilled artisan, including, for example, a variable, an array, a linked list, an object, or the like. In some embodiments, data structures for receiving return values may not be placed in the queues 240. Instead, the component adapters 210-216 may directly update the process engine 246 with output data. According to an embodiment, the adapter registry 218 associates the local operation 219 with an external operation 221 and a component adapter 223. The associated external operation 221 identifies the operation's name and parameters for invoking the operation on a component adapter 223. The associated external operation 221 may have the same name and parameters as the local operation 219, but this is not necessary. As illustrated with regard to this example, the associated external operation 221 has a different name "FindName(ID#)" than does the local operation 219 "GetName(ID#)."

In one embodiment, the component manager 204 determines an associated component adapter 223 using the adapter registry 218. The component adapter 210-216 calls the associated external operation 221 on the appropriate external component 230-236. With regard to the example, the component manager 204 invokes the Java component adapter 210 and calls the "FindName(ID#)" procedure. According to an embodiment, invoking one of the component adapters 210-216 includes invoking one of the component adapter instances that had previously been spawned according to a definition of the appropriate component adapter 210-216 contained in the available component definitions 220. The component manager 204 also transmits, to the component adapter 210-216, any values and data structures from the queues 240 that pertain to each particular operation call. With regard to the example, the component manager 204 transmits the "100" value and the "CustomerName" data structure.

Alternatively or additionally, the component adapter 210-216 itself may receive the input data directly from the queues 240 and may perform the foregoing step of determining which external component 230-236 and which external operation to invoke.

The component adapter 210-216 establishes communication with its corresponding external component 230-236. According to an embodiment, establishing communication may include performing handshaking operations, authentication operations, and the like. For example, the component adapter 210-216 may transmit authentication information, such as, for example, a username and password, to the external component 230-236. Possible authentication schemes are not limited to schemes using a username and password; any authentication scheme known to a skilled artisan may be used. According to one embodiment, the component adapter 210-216 and the external component 230-236 use JAAS. Advantageously, regardless of the authentication scheme used, the component manager 204 may store or have access to authentication information, such as, for example, a username and password, associated with some or all of the component adapters 210-216 and external components 230-236. When such information is stored, the component manager 204 may transmit the stored authentication information to the appropriate component adapter 210-216. Alternatively or additionally, the component manager 204 may include such information within any new instance of a component adapter 210-216 that it creates. Advantageously, providing authentication information within the component manager 204 or the component adapter 210-216 alleviates, in whole or in part, a need for a human user to input authentication information each time a component adapter 210-216 accesses an external operation. This enhances the ability to integrate external components into local applications and automated processes.

Upon establishing communication, the component adapter 210-216 transmits to the external adapter 230-236 any information that the external adapter 230-236 needs to process the external operation. The external adapter 230-236 processes the external operation, including, for example, by accessing and processing information on or accessible by a server associated with the external adapter 230-236. The external adapter 230-236 generates a response, which may include one or more return values for filling data structures for receiving the return values. For example, with regard to the exemplary FindName(ID#) operation, the external Java adapter 230 may generate a string, such as, for example, "Bill Jones," that identifies a customer by name, and that can be received by the CustomerName data structure. The external component 230-236 transmits the response to the corresponding component adapter 210-216. Alternatively or additionally, the external adapter 230-236 may transmit, as part or all of its response, an acknowledgement message indicating that the external component 230-236 has completed the requested operation.

According to one embodiment, upon receiving the response, the component adapter 210-216 transmits the response to the process engine 246 or the component manager 204, depending on whether component adapter 210-216 received the input data directly from the queues 240 or from the component manager 204. In embodiments in which the component adapters 210-216 transmit output to the component manager 204, the component manager 204, in turn, transmits the output to the appropriate queue 240, including by returning one or more completed data structures containing the output, such as, for example, a completed CustomerName data structure. The component adapter 210-216 may transmit at least an indication to the component manager 204 that the operation has completed. Upon receiving any output, the process engine 246 may incorporate the output into its further processing.

As shown with regard to the foregoing embodiments, the queues 240 provide one interface for inputting data, directly or indirectly, into the component adapters 210-216 from a process engine 246. Advantageously, other applications besides the process engine 246 may be designed to include queues 240 such that they can interact with the component adapters 210-216. Additionally, other applications besides the process engine 246 may be configured to send messages to the component adapters 210-216, when the component adapters 210-216 operate according to an event-driven model. Advantageously, providing access to the queues 240 provides access, from within an application, to external operations performed by external components 230-236. Security mechanisms may be provided to restrict access to the queues 240, such that an application does not steal data from the queues 240. Security mechanisms may also restrict use of particular external operations by particular users. For example, security mechanisms may prevent ordinary employees from accessing a "ChangeSalary" external operation. A skilled artisan will appreciate in light of this disclosure that other mechanism may be used to provide input to the component adapters 210-216. For example, an interface may be provided for directly inputting information to the component adapters 210-216.

As indicated, the disclosed systems and methods may be used to integrate external operations executed by external components 230-236 into an application, such as a process engine 246. Following is a description of how an external operation may be integrated into a workflow process executed by a workflow processing engine 246. A workflow processing engine, such as the workflow processing engine 246, encompasses its broadest ordinary meaning, and includes a computer application that enforces workflow process definitions that define a series of steps to be completed by one or more users, where a user is defined broadly to include human users and automated processes. Each step of a workflow process may define data to be entered, calculations to be made, and other tasks to be performed, and may also define which user or users have access to which data and which user is to perform each task. A workflow processing engine may route tasks, including associated data, to appropriate users, inform users of tasks to be completed, maintain status information including completed portions of each task, receive additional data entered by each user, route tasks to other users when a user completes a portion of a task, allow users to delegate tasks, and the like.

As illustrated, the workflow processing engine 246 may execute a simplified workflow process comprising various workflow process steps. As illustrated, in one workflow process step, the workflow process may access a "GetName (ID#)" operation 248. The workflow processing engine 246 includes a workflow process design tool that provides a graphical user interface. The graphical user interface allows a designer 250 to graphically manipulate and design one or more workflow processes. In one embodiment, the graphical user interface allows the designer 250 to incorporate an external operation within any workflow process step. In one embodiment, the graphical user interface may present to the designer 250 a list of available external components, such as in a drop-down selection list. The designer 250 may select one of the available external components from the drop-down selection list. Then, the graphical user interface may present to the designer 250 a list of available external operations associated with the selected component, such as in a second drop-down selection list. The designer 250 may select one of the available external operations from the second drop-down selection list. With regard to the illustrated "GetName(ID#)," the designer 250 may incorporate the external operation by first selecting "Java component" or a like designation from an available components drop-down selection list and then selecting "GetName(ID#)" or a like designation from an available operations drop-down selection list. The design tool further allows the designer 250 to designate actual values or variables to fill parameters, such as, for example, the "ID#" parameter. Additionally, the design tool allows the designer to designate one or more data structures for receiving any results from the external operations. Advantageously, therefore, external operations may interact with operations provided by the workflow processing engine 246 and accessible to the design tool as if the external operations were provided by the workflow processing engine 246.

After the workflow process has been designed, the workflow processing engine 246 may execute the workflow process. When the workflow processing engine 246 reaches a step that invokes an external component and external operation, such as, for example, the workflow process step 248, the workflow processing engine 246 may determine, based on the design entered by the designer 250, the data to insert into the queues 240, such as, for example, "GetName," "100," and ("CustomerName"), as previously discussed in relation to the discussion concerning operation of the component manager 204 and component adapters 210-216. As previously indicated, placing such data in the queues 240 starts the process of executing the external operation using the component adapters 210-216. As indicated, the component manager 204 or component adapters 210-216 detect that the data has been placed on the queues 240, either by polling or, in event-driven mode, by receiving a message from the queues 240 indicating that data has been entered in the queues 240. Where the component manager 204 detects new data, the component manager 204 then handles transmission to an appropriate component adapter 210-216 and receipt of information from the appropriate component adapter 210-216, as previously indicated. Alternatively, the component adapters 210-216 themselves commence accessing the external operation and return any received output directly to the process engine 246. The workflow processing engine 246 receives any output and incorporates the output into other workflow process steps.

In one embodiment, the task manager 242 manages communication between the queues 240, the component manager 204, and the component adapters 210-216. The task manager 242 may monitor the number of transmissions performed by the component manager 204, the status of the queues 240, such as, for example, how much data, within the queues 240, remains to be processed, whether any transmission bottlenecks are occurring, and the like. Based on this information, the task manager 242 may alter the rate of transmission such as by speeding transmission rates up when no bottlenecks are occurring and a large amount of data remains in the queues 240 or slowing transmission rates down when bottlenecks are occurring. According to an embodiment in which polling of the queues 240 occurs, the task manager 242 may change the polling cycle to cause polling to occur more frequently or less frequently.

Figure 3:
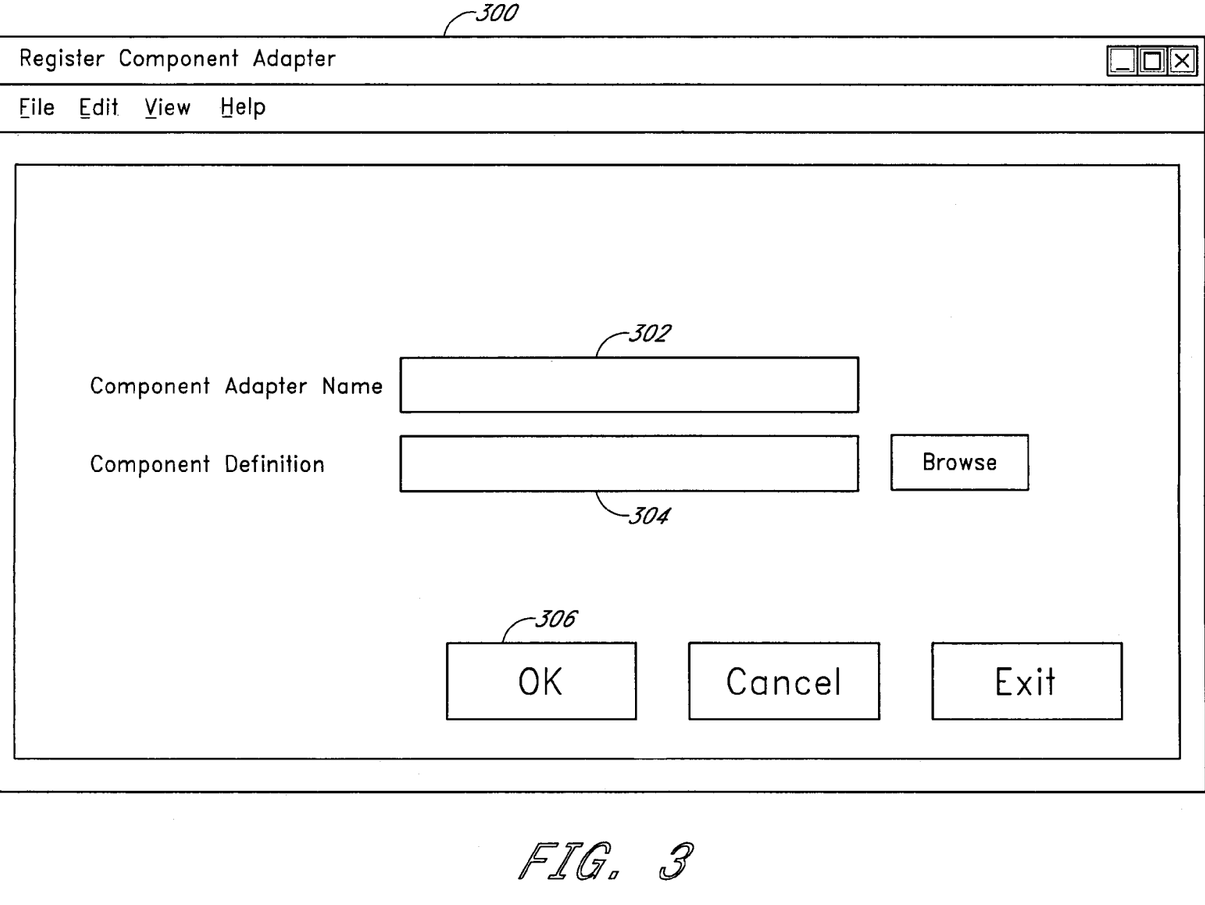
FIG. 3 is a simplified graphical user interface for registering a component adapter of FIG. 1.

According to the foregoing embodiments, the component manager 204 may manage one or more installed component adapters 210-216, as described. Additionally, a configuration module 206, accessible to an administrator 252 may comprise a register component adapter module for making additional component adapters available to the component manager 204 and the process engine 246. As indicated, each component adapter is defined using a component definition, such as those contained within the available component definitions 220. According to one embodiment, additional available component definitions 220 may be added and registered using, for example, a register component adapter graphical user interface 300 as depicted in FIG. 3. As shown, the register component adapter graphical user interface 300 comprises a component adapter name field 302 and a component definition field 304. The administrator 252 may use the user interface 300 to register an additional component definition by specifying a component adapter name in the component adapter name field 302 by specifying a path and name of a component definition in the component definition field 304, and by saving the registration, such as by clicking on an "OK" button 306.

Figure 4:
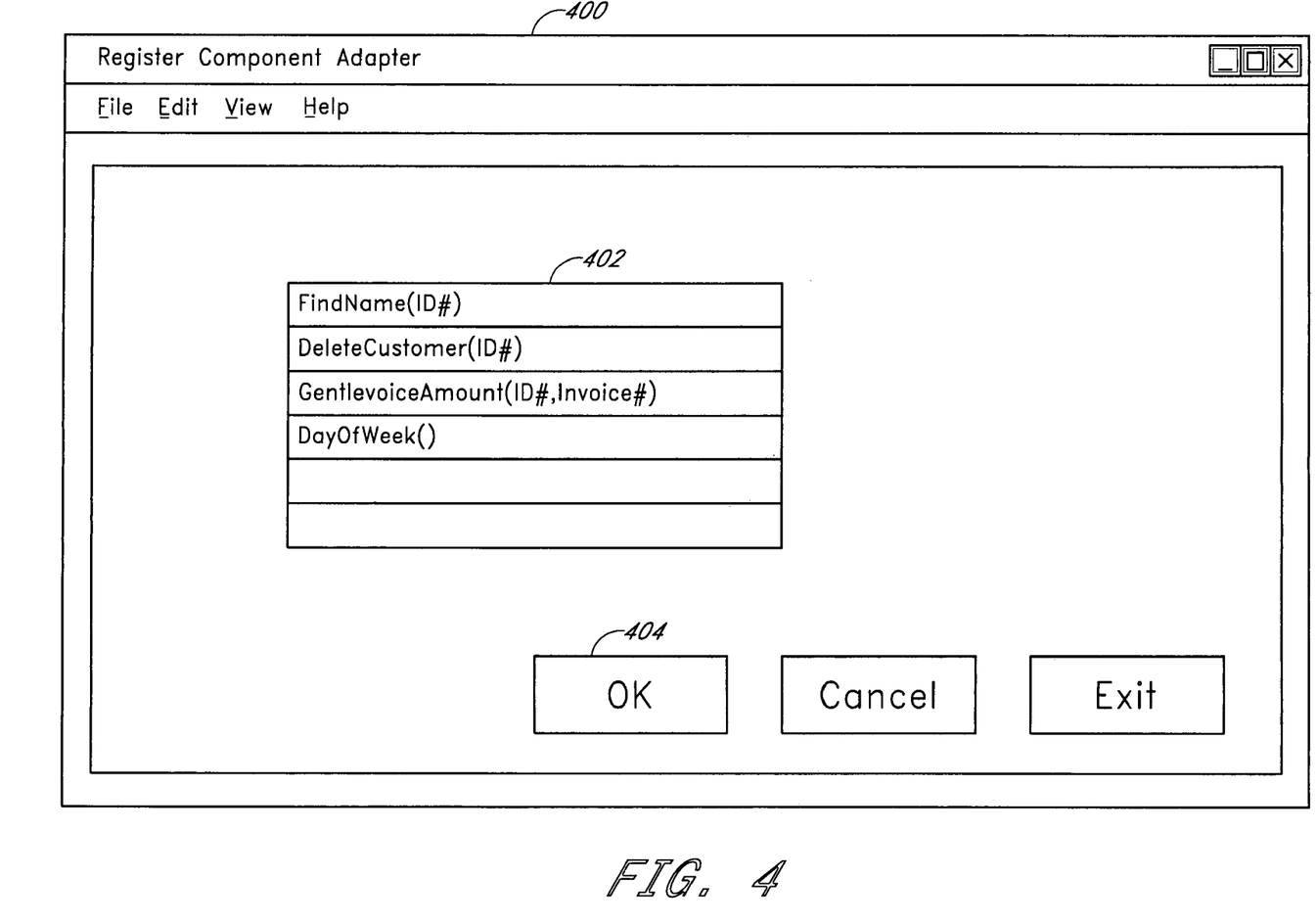
FIG. 4 is a simplified graphical user interface for importing external operations to make them accessible to the component manager of FIG. 1.

Additionally, the configuration module 206 may further comprise an "Import External Operation" module, as illustrated by the exemplary screen shot of FIG. 4. FIG. 4 is an exemplary screen shot of an "Import External Operation" graphical user interface 400 comprising an external operation drop-down selection list 402. As illustrated, the external operation drop down selection list 402 may display a listing of external operations available within a particular external component. Generally, the particular external component is a user-selected one of the external components defined by the external component and operation definitions 208. The administrator 252 may highlight one or more of the listed external operations and click on an "OK" button 404 to have the "Import External Operation" module make the external operations available to the component manager 204 and the process engine 246. In one embodiment, the configuration module 206 reads information about each external operation from external component and operation definition repositories 208, as previously described. Based on the selected operations and the operation definitions stored in the repositories 208, the component manager 204 adds appropriate information to the component adapter registry 218.

Figure 5:
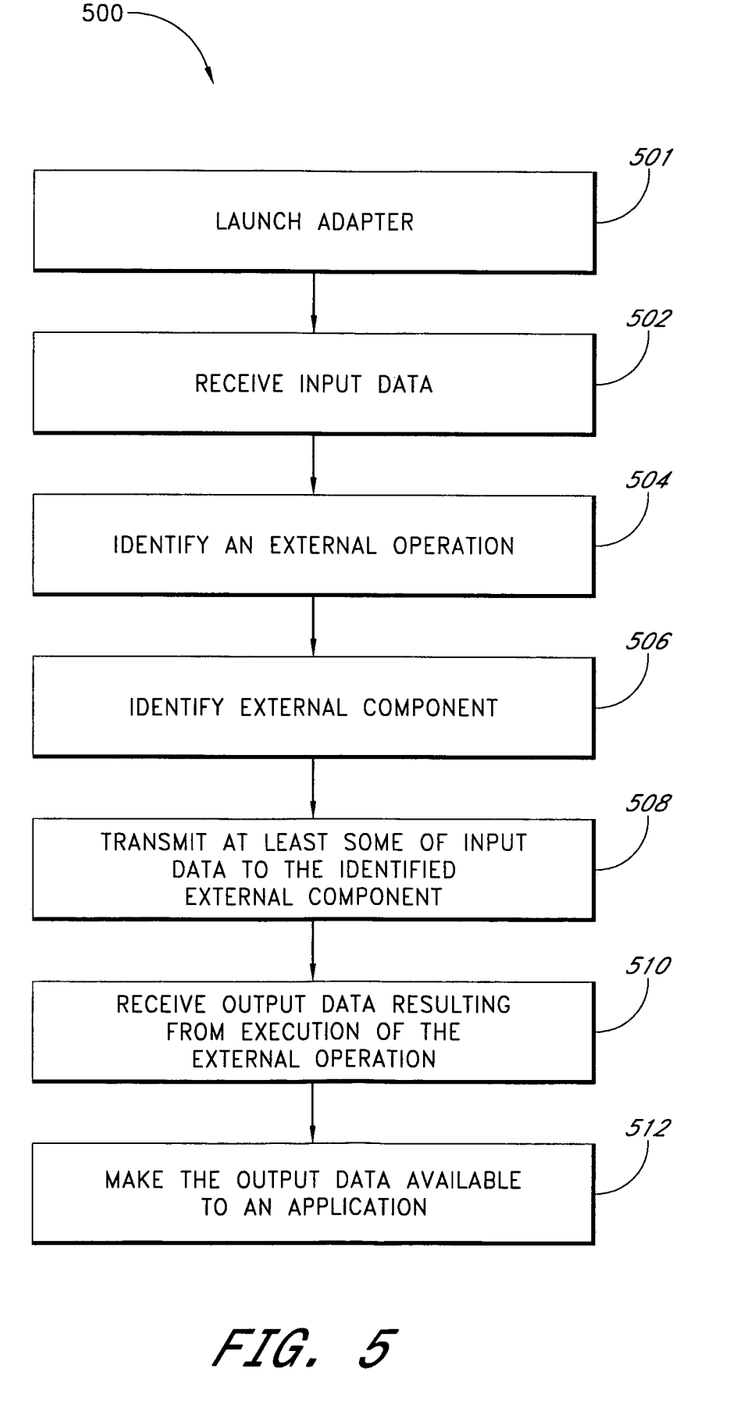
FIG. 5 is a flow chart illustrating an exemplary embodiment of an external component access process as can be practiced by the component management system of FIG. 1.

FIG. 5 is a flow chart of an exemplary external operation access process 500 as may be managed by the component manager 204. In a block 501, one or more instances of component adapters may be launched. In one embodiment, the component manager 204 instantiates the component adapters 210-216 according to information within the adapter registry 218, the available component definitions 220, and the available operation definitions 222. In a block 502, input data are received. In one embodiment, the component adapters 210-216 receive the input data from the queues 240. According to one embodiment, the component adapters 210-216 poll the queues 240 and request data when new data has been entered into the queues 240. According to one embodiment, the component adapters 210-216 request data after receiving a message that the queues 240 have new data. In one embodiment, the component manager 204 receives the data, either after polling or receiving a message. In a block 504, an external operation that is to be executed is identified. In one embodiment, the component manager 204 or the component adapters 210-216 make this determination based on one or more of the input data, data derived from the adapter registry 218, data derived from the available component definitions 220, and data derived from the available operation definitions 222. In a block 506, an external component configured to execute the external operation is identified. The component manager 204 or the component adapter 210-216 may make this identification. In a block 508, some or all of the input data is transmitted to the identified external component for processing. In one embodiment, the component adapter 210-216 performs this transmission. In one embodiment, the transmission may include participating in handshaking and/or authentication activities. In a block 510, output data resulting from the execution of the external operation are received. In one embodiment, the component adapter 210-216 receives the output data. In one embodiment, the output data are received in the form of data structures that have received values from the identified external component. In an optional block 512, the output data are made available to be read by at least one application. In one embodiment, the component manager 204 makes the output data available by directly updating the application.

The foregoing describes embodiments of the invention but does not define the invention. While several features of the various embodiments are advantageous, no such feature is an essential limitation of the invention. The claims alone, and no other part of this disclosure, define the scope of the invention.

What is claimed is:

1. A system for providing access to external operations from within local applications, comprising:
   a plurality of queues for storing input data;
   a component adapter registry configured to associate a plurality of component adapters with a plurality of external components and with a plurality of external operations performed by the plurality of external components, wherein each component adapter from the plurality of component adapters is associated with a queue from the plurality of queues and communicates with an associated external component from the plurality of external components and causes the external component to execute an external operation from the plurality of external operations selected by that component adapter;
   a plurality of component definitions identifying the plurality of component adapters for accessing the plurality of external components;
   a plurality of operation definitions identifying the plurality of external operations, wherein at least one operation definition includes a description of parameters that are received by an external operation and parameters that are returned by that external operation;
   a component manager in communication with the component adapter registry, the plurality of component definitions, and the plurality of operation definitions, configured to:
      receive input data that at least in part, aids the component manager to identify an external operation from the plurality of external operations that is to be executed, wherein the input data is stored in a queue from the plurality of queues that comprises one or more data structures;
      identify, with reference to the input data, the component adapter registry, the plurality of component definitions, and the plurality of operation definitions, the external operation that is to be executed and a component adapter from the plurality of component adapters that causes an external component from the plurality of external components to execute the identified external operation;
      transmit a request for the identified component adapter to cause the external component from the plurality of external components to execute the identified external operation; and
      receive data from the identified component adapter, wherein the received data results from the execution of the identified external operation.

2. The system of claim 1 further comprising a configuration module configured to retrieve new or updated component definitions and operation definitions.

3. The system of claim 1, wherein the component manager is further configured to retrieve the input data from the queue.

4. The system of claim 3, wherein the component manager periodically polls the queue to determine if data resides in the queue, and retrieves the data upon determining that data resides in the queue.

5. The system of claim 3, wherein the queue transmits a message to the component manager when data is added to the queue and the component manager retrieves the added data upon receiving the message.

6. The system of claim 5, wherein the queue has an interface that defines operations that allow applications to input data into the queue and to extract data from the queue.

7. The system of claim 6, wherein at least one of the applications allowed to input data into the queue and to extract data from the queue comprises a workflow process engine.

8. The system of claim 1, wherein the component manager is in communication with a workflow process engine such that the workflow process engine is capable of using the component manager to have one or more of the plurality of external components executed based on input parameters derived from data known to the workflow process engine and the workflow process engine is capable of receiving from the component manager any output received as a result of executing one or more plurality of the external components.

9. The system of claim 8, wherein the workflow process engine comprises a design tool that allows a user of the workflow process engine to define a workflow process that incorporates at least one external operation from the plurality of external operations.

10. The system of claim 9, wherein the design tool comprises a graphical user interface.

11. A system for providing access to external operations from within local applications, comprising:
    a plurality of queues for storing input data;
    a component adapter registry configured to associate a plurality of component adapters with a plurality of external components and with a plurality of external operations performed by the plurality of external components, wherein each component adapter from the plurality of component adapters is associated with a queue from the plurality of queues and communicates with an associated external component from the plurality of external components and causes the external component to execute an external operation selected by that component adapter;
    a plurality of component definitions identifying the plurality of component adapters for accessing the plurality of external components;
    a plurality of operation definitions identifying the plurality of external operations, wherein at least one operation definition includes a description of parameters that are received by an external operation from the plurality of external operations and parameters that are returned by that external operation;
    a component manager in communication with the component adapter registry, the plurality of component definitions, and the plurality of operation definitions, configured to launch a plurality of component adapters defined by the component adapter registry, the plurality of component definitions, and the plurality of operation definitions, wherein each component adapter is configured to:
receive input data that, at least in part, aids the component adapter to identify an external operation from the plurality of external operations that is to be executed, wherein the input data is stored in a queue from the plurality of queues that comprises one or more data structures;
identify, with reference to the input data, data derived from the component adapter registry, data derived from the plurality of component definitions, and data derived from the plurality of operation definitions, the external operation that is to be executed and an external component from the plurality of external components that executes the identified external operation;
transmit a request for the identified external component to execute the identified external operation; and
receive data from the identified external component, wherein the received data results from the execution of the identified external operation.

12. The system of claim 11 further comprising a configuration module configured to retrieve new or updated component definitions and operation definitions.

13. The system of claim 11, wherein each component adapter is further configured to retrieve the input data from the queue.

14. The system of claim 13, wherein each component adapter periodically polls the queue to determine if data resides in the queue, and retrieves the data upon determining that data resides in the queue.

15. The system of claim 13, wherein the queue transmits a message to the component adapter when data is added to the queue and the component adapter retrieves the added data upon receiving the message.

16. The system of claim 15, wherein the queue has an interface that defines operations that allow applications to input data into the queue and to extract data from the queue.

17. The system of claim 16, wherein at least one of the applications allowed to input data into the queue and to extract data from the queue comprises a workflow process engine.

18. The system of claim 11, wherein each component adapter is in communication with a workflow process engine such that the workflow process engine is capable of using the each component adapter to have one or more plurality of the external components executed based on input parameters derived from data known to the workflow process engine and the workflow process engine is capable of receiving from each component adapter any output received as a result of executing one or more plurality of external components.

19. The system of claim 18, wherein the workflow process engine comprises a design tool that allows a user of the workflow process engine to define a workflow process that incorporates at least one external operation from the plurality of external operations.

20. The system of claim 19, wherein the design tool comprises a graphical user interface.

* * * * *